United States Patent
Tarnanen et al.

(10) Patent No.: US 6,721,575 B1
(45) Date of Patent: Apr. 13, 2004

(54) SPEECH/USSD INTEROPERABILITY MECHANISM

(75) Inventors: Teemu Tarnanen, Espoo (FI); Sami Yliharju, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/807,477

(22) PCT Filed: Oct. 11, 1999

(86) PCT No.: PCT/FI99/00843
§ 371 (c)(1),
(2), (4) Date: Jun. 13, 2001

(87) PCT Pub. No.: WO00/22852
PCT Pub. Date: Apr. 20, 2000

(30) Foreign Application Priority Data

Oct. 13, 1998 (FI) .................................................. 982219

(51) Int. Cl.⁷ ............................................... H04B 7/26
(52) U.S. Cl. .................... 455/509; 455/452.2; 455/466; 455/434; 370/348; 370/341; 370/345
(58) Field of Search ................ 455/450, 434, 455/451, 466, 452.1, 509, 452.2; 370/34.1, 54.1, 348, 341, 522, 345, 37.01, 332, 392, 474

(56) References Cited

U.S. PATENT DOCUMENTS

| | | | | |
|---|---|---|---|---|
| 5,239,678 A | * | 8/1993 | Grube et al. | 455/511 |
| 5,896,376 A | * | 4/1999 | Alperovich et al. | 370/348 |
| 6,185,208 B1 | * | 2/2001 | Liao | 370/392 |
| 6,295,302 B1 | * | 9/2001 | Hellwig et al. | 370/522 |

FOREIGN PATENT DOCUMENTS

| | | |
|---|---|---|
| GB | 2 301 749 | 12/1996 |
| WO | WO 96/09708 | 3/1996 |
| WO | WO 98/26523 | 6/1998 |

* cited by examiner

Primary Examiner—Marsha D. Banks-Harold
Assistant Examiner—Randy Peaches
(74) Attorney, Agent, or Firm—Pillsbury Winthrop LLP

(57) ABSTRACT

A method for performing USSD transfer between a mobile station and a cellular communications network. The USSD transfer has a maximum data rate equal to the data rate of an associated control channel. The method comprises the following steps: 1) evaluating a set of factors in favor of the maximum data rate, for forming a totality of factors, the totality being at least partly independent of the existence of the associated channel prior to said evaluating; 2) comparing the totality of factors to a predetermined margin; and 3) performing the USSD transfer substantially at the maximum data rate in response to a positive result in said comparison, and otherwise at a lower data rate.

17 Claims, 3 Drawing Sheets

SPEECH/USSD INTEROPERABILITY MECHANISM

This application is the National Phase of International Application PCT/FI99/00843 filed Oct. 13, 1999 which designated the U.S. and that International Application was Published under PCT Article 21(2) in English.

BACKGROUND OF THE INVENTION

The invention relates to improving the performance of USSD (Unstructured Supplementary Service Data) transfer in a cellular communications system, such as GSM (Global System for Mobile Communication).

The user of a mobile station (MS) can use USSD to give instructions to the supporting PLMN (Public Land based Mobile Network). For example, incoming calls can be routed to number 123456 by dialling *21*#123456#. USSD is also one of the mechanisms for implementing new services. USSD allows an MS and a service application to communicate with each other by character strings, in a way which is transparent to the MS and to the intermediate network elements. USSD can be used as a narrow-band bearer for over-the-air (OTA) and value-added services (VAS) applications. With respect to a more detailed description of the USSD, reference is made to the following ETSI GSM recommendations: GSM 02.90: European digital cellular telecommunications system (Phase 2); Stage 1 description of Unstructured Supplementary Service Data (USSD), GSM 03.90: Digital cellular telecommunications system (Phase 2); Unstructured Supplementary Service Data (USSD)—Stage 2, and GSM 04.90: European digital cellular telecommunications system (Phase 2); Unstructured Supplementary Service Data (USSD)—Stage 3. USSD requests, notifications and responses contain a USSD string, an alphabet indicator and a language indicator, as defined in GSM 03.38.

USSD signalling may be initiated by the mobile station or by the network. Phase 1 supports only MS-initiated USSD. Network-initiated USSD service requires that all parts of the mobile communications system be at least phase 2 systems. The mobile communications network may at any time send a USSD message to a mobile station MS registered with the network in order to transmit information to the subscriber. This operation may be either a request (asking the MS to provide information) or a notification (requiring no information to be provided by the MS). No prior provisioning of USSD is required, although provisioning of services which make use of USSD may be required.

According to the above ETSI recommendations, USSD signalling takes place between an MS and an MSC/VLR (Mobile services Switching Centre/Visitor Location Register) or HLR (Home Location Register). USSD supports a maximum of 160 bytes of user data per message. (The upper limit can be less than 160 bytes depending on the underlying protocol layers.) Unlike SMS (Short Message Service), USSD has no store-and-forward functionality: mobile-terminated USSD messages are delivered to the MS immediately, or the delivery fails (e.g. because the MS is unreachable).

For the purposes of this application, a GSM-type mobile station has two modes: a call mode and an idle mode. A mobile station is in call mode if and only if it is "in a call", which state is defined in the GSM recommendation 02.30.

According to the above ETSI recommendations, USSD transfer takes place on two different channels depending on whether or not the MS is in call mode or idle mode. In call mode, Fast Associated Control Channel (FACCH) is used. In idle mode, Slow Dedicated Control Channel (SDCCH) is used.

The speed of the FACCH channel is approximately 140 bytes per second and that of the SDCCH channel approximately 83 bytes per second. Thus, even in idle mode, any USSD message can be delivered in less than two seconds.

It is conceivable that the use of USSD for implementing value-added and over-the-air services will increase. In this case, especially if multiple consecutive USSD messages are needed, the slow transfer speed of the SDCCH channel could be seen as a problem. Also, prolonged use of the FACCH channel degrades the quality of speech on the associated speech channel. (It should be noted that for keeping the description compact, FACCH is used as a synonym for the fast channel, and SDCCH is used as a synonym for the slow channel. However, FACCH and SDCCH are terms used in the GSM system and its derivatives, but these terms are not necessarily used in future cellular systems.)

BRIEF SUMMARY OF THE INVENTION

Accordingly, it is an object of the present invention to study if the speed of USSD in idle mode could be improved, and if yes, to provide a method and equipment for improving the speed of USSD in idle mode. Another object of the present invention is to study if the degradation in speech quality due to prolonged use of the FACCH channel can be minimised. Yet another object is to develop a mechanism that is expandable to accommodate future modifications. All these objects are achieved with a method and equipment which are characterized by what is disclosed in the attached independent claims. Preferred embodiments are disclosed in the attached dependent claims.

A straightforward way of improving the speed of USSD transfer would be to specify that all USSD transfers take place on the fast FACCH channel. This would, however, require changes in existing standardisation. Also, the FACCH is not a dedicated channel, but an associated one, which means that it is implemented by stealing bits from the associated speech channel, if one exists. If such bit stealing is allowed to go on frequently and for long periods of time, it will degrade speech quality to some extent. On the other hand, if the mobile station is not in call mode, establishing the FACCH for the sole purpose of USSD transfer requires establishing a corresponding speech channel, which could be seen as a waste of radio resources. The user of the MS may not want to pay extra for speeding up the USSD transfer and, if the network is heavily loaded, the operator may not want to allocate an extra speech channel for the sole purpose of speeding up USSD transfer.

Similarly, a straightforward way of eliminating the degradation of speech quality would be to specify that all USSD transfers take place on the slow SDCCH channel. This would, however, be a drastic solution. Moreover, in the current GSM system an SDCCH channel does not exist when the MS is in call mode.

The invention is based on locating the problem and finding a solution for it. The solution is based on an expandable concept that can be implemented, at first, as a simple on/off mechanism, but which can be extended to balance the different needs and interests of the parties of the call as listeners, the MS user as a user of OTA and/or VAS applications, the network operator, and the other users of the network.

According to the invention, the degradation of speech quality is lessened or totally eliminated by substantially lowering the data rate of the USSD transfer when necessary, in order to maintain adequate speech quality.

The data rate can be lowered by using the dedicated control channel SDCCH, if one exists. In a GSM system and its derivatives, the SDCCH exists unless the mobile station is in call mode. If a dedicated control channel does not exist, the data rate can be lowered by dividing a long USSD transfer into several consecutive USSD messages and delaying individual USSD messages (by inserting gaps between them) until the degradation of speech quality is brought to an acceptable level.

The expandable concept for performing USSD transfer can be implemented e.g. by a method including at least the following steps:

(i) evaluating a set of factors in favour of the maximum data rate for forming a totality of the factors, the totality being at least partly independent of the existence of said associated channel prior to said evaluating; and (ii) using the totality of the factors to determine whether to perform the USSD transfer substantially at the maximum data rate or at a lowered data rate.

Performing the USSD transfer substantially at the maximum data rate implies that the FACCH channel will be used and that the data rate is not lowered sufficiently to substantially improve the quality of possible simultaneous speech on the speech channel (the improvement due to the lowered data rate is not clearly audible to a human ear).

In this context, the totality of factors means more or less the same as evaluating substantially all factors available to (i.e. known by) the decision-making process. By giving different interpretations to the 'factors in favour of the maximum data rate' the invention can be implemented in an extendible manner.

The invention can be implemented in a very simple manner if the totality of factors favouring the maximum data rate is a simple determination that a need for USSD transfer exists and an FACCH channel is available or can be established.

The totality of the factors in favour of the maximum data rate can be used to determine the data rate by comparing the totality of the factors to a predetermined margin and by performing the USSD transfer substantially at the maximum data rate in response to a positive result in the comparison. If the result of the comparison is negative, the USSD transfer takes place at a lower data rate. Preferably, this means performing the USSD transfer on a dedicated control channel (SDCCH), if one exists, and otherwise delaying individual USSD messages. The network operator can transmit to decision-making units, such as mobile stations, one or more elements affecting the comparison, such as the predetermined margin. For example, when the network load increases, the operator can transmit a higher margin which would disfavour the use of the maximum data rate. Such parameter(s) can be transmitted on a broadcast control channel, or as USSD or short message transmissions, as is well known to those skilled in the art. Because the predetermined margin is compared with the factors favouring the maximum data rate, the same result is achieved if the network operator transmits one or more elements affecting these factors, as will be described later in more detail.

A more flexible implementation than a simple on/off approach is achieved if the totality of the factors is formed by weighing each factor with a respective weight and combining the results of the weighing. It is also possible to similarly evaluate another set of second (negative) factors disfavouring the maximum data rate. Such second, or negative, factors could include a determination that the network is heavily loaded. However, this is not necessary, considering that all such negative factors have an opposite positive factor (i.e. an absence of a negative factor). For example, the opposite of a heavy load in the network is the availability of radio resources.

Positive factors favouring the maximum data rate could comprise one or more of the following:

1) the amount of data to be transmitted;
2) the availability of radio resources in the network;
3) the relative amount of silence on the speech channel;
4a) the length of time from the beginning of the call
4b) duration of continuous speech, i.e. the length of time from the latest period of silence on the associated speech channel
5) the MS user's preference of USSD transfer over speech quality.

The availability of radio resources in the network should be considered, especially when there is no call going on between the mobile station and the network. In such a case, USSD transfer is the only reason for establishing a speech channel, which is necessary for establishing an FACCH. In a heavily loaded network, the operator can be reluctant to allocate a speech channel for the sole purpose of speeding up USSD transfer. On the other hand, if there is a call going on, then using the FACCH does not consume any additional resources, but it does degrade the quality of speech to some extent.

The amount of data to be transmitted should be considered too. There is little point in using the FACCH for very short transmissions.

The relative amount of silence on the speech channel could be considered as well. Using the FACCH degrades the quality of speech to some extent but this is of no consequence if there is currently no speech on the speech channel. Considering that a call involves two parties, of which usually only one speaks at any given moment, approximately 50 per cent of the time the content of the speech channel does not consist of speech frames but silence indicators, known as SID (Silence Descriptor) frames in the GSM system. A base station subsystem BSS (a base station, base station controller and/or a transcoder) could be modified to respond to an inquiry from an external node regarding the relative amount of SID frames. It is to be expected that in future cellular systems, such as UMTS (Universal Mobile Telecommunications System), the elements of the BSS will be more deeply integrated into a Radio Network Controller RNC. Such integration facilitates implementing the invention in respect of detecting silence indicators on the speech channel.

A small relative weight could also be given to the length of time from the beginning of the call and/or from the latest period of silence on the speech channel. This is because the beginnings of continuous speech are crucial for understanding. If the call has been going on for a minute or two and/or continuous speech has been going on for a few seconds, the listener can much better tolerate the degradation of speech quality due to usage of the FACCH.

For the purpose of demonstrating the expandable nature of the invention, some additional factors will be presented near the end of the description.

An USSD transfer may consist of several separate USSD messages and it may go on for several minutes. (Currently, its maximum duration is limited to 10 minutes.) During a long USSD transfer, the factors favouring (or disfavouring) the use of the FACCH may change considerably. Thus it is preferable to repeat the evaluation between successive USSD messages, although not necessarily between every two messages.

BRIEF DESCRIPTION OF THE DRAWINGS

The method and the equipment according to the invention will be described in more detail by means of preferred embodiments with reference to the appended drawings, in which.

DETAILED DESCRIPTION OF THE INVENTION

Figure 1:
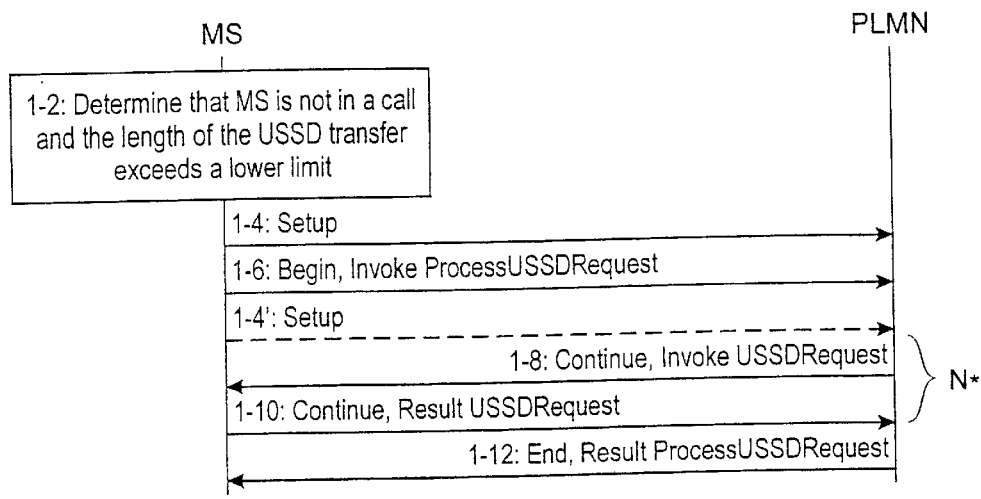
FIGS. 1 to 3 are signalling diagrams illustrating various mechanisms for establishing a FACCH channel if one is not already active.

Before various embodiments of the invention proper, several mechanisms for establishing an FACCH channel will be described. These techniques are described in reference 1. Since reference 1 was not public at the priority day of the present application, its inventive subject matter is repeated here, with reference to FIGS. 1 to 3 of the appended drawings.

The mechanisms described in reference 1 are based on the idea that the amount of USSD data is determined, and if the amount exceeds (or is likely to exceed) a predetermined threshold (i.e. for lengthy USSD transmissions), the faster FACCH channel is activated by directing the MS into call mode. A simple way of accomplishing this is to perform an unsuccessful call attempt. Thus these mechanisms are also based on a novel interpretation of a call mode, as specified in the above-referenced GSM recommendation 02.30, wherein the call mode is defined as follows: A mobile station is in a call from the time that signalling related to the establishment or attempted establishment of a mobile originated or mobile terminated call commences, and before the call or call attempt ends, and (if applicable), the mobile equipment has stopped generating tones related to this call to the user. Fooling the MS into call mode (by performing an unsuccessful call attempt) activates the faster FACCH channel for USSD transfer. However, it should be noted that the mobile station is "in a call" as defined by ETSI GSM 02.30, whereby the novel mechanisms require no deviations from existing standards. Thus the method and equipment according to the invention solve the problem of the prior art USSD transfer in an elegant manner.

The novel mechanisms are also based on determining the amount of USSD data (i.e. the length of USSD transmission) and on using the FACCH channel only for lengthy USSD transmissions. Performing the unsuccessful call attempt for short USSD transmissions would create unnecessary signalling load, which is especially harmful at the air interface. This signalling load must be balanced against the savings in time provided by the mechanism of the invention. For example, the FACCH could be used only if using it saves at least one second. Because the FACCH transfer is approximately 1.7 times faster than SDCCH transfer, it saves about 40% of the time needed by the SDCCH transfer. If it is required that at least one second must be saved, a minimum length for an USSD message would be 250 bytes. This exceeds the length of a single USSD message. In other words, performing the unsuccessful call attempt is useful only with multiple consecutive USSD messages (assuming 83 and 140 bytes per second for the SDCCH and the FACCH, respectively, and a minimum saving of one second). Of course, it must be remembered that initiating the unsuccessful call attempt wastes a fraction of a second. Thus the logic for initiating the unsuccessful call attempt should be placed at the top of the protocol stack, i.e. at the application layer. Otherwise the logic will not know that multiple USSD messages are needed.

FIG. 1 is a signalling diagram illustrating mobile originated USSD transfer. Time advances from top to bottom. A USSD dialogue between two parties will be described. One of the parties is a mobile station MS and the other one is a part or an element of a public land based mobile network PLMN serving the MS. The MS can be a small handportable cellular radio telephone but the invention is best utilised if the mobile station comprises or is associated with data processing equipment. An example of such a mobile station is the Nokia Communicator 9000. Another example is a general-purpose portable computer connected with a Nokia Cellular Datacard to a cellular radio telephone with a suitable interface, such as the Nokia 2110 or 8110. All Nokia equipment is available from Nokia Mobile Phones, Finland.

In step 1-2 a mobile station MS in idle mode determines that the length of the USSD transfer exceeds a predetermined threshold, which could be approximately 250 bytes. In step 1-4 the MS initiates a call attempt that ultimately should fail. One way of achieving this is to call a non-existent number. Alternatively, the MS could call itself. (At some later stage, the network PLMN will reply that the called subscriber does not answer, but this reply is not significant for understanding the invention.) Steps 1-6 through 1-12 constitute a mobile originated USSD dialogue which is known per se. In step 1-6 the MS initiates the USSD dialogue by sending a BEGIN, INVOKE PROCESSUSS-DREQUEST message to the network. (The primed message 1-4' will be explained later.) In step 1-8 the network responds with a CONTINUE, INVOKEUSSDREQUEST message. In step 1-10 the MS sends a CONTINUE, RESULT USSDREQUEST message. The symbol "N*" indicates that the dialogue can comprise multiple pairs of messages 1-8 and 1-10. Finally in step 1-12, the USSD dialogue is terminated by an END, RESULT PROCESSUS-SDREQUEST message from the network.

The primed message 1-4' relates to an alternative embodiment of the mobile originated USSD transfer, wherein the call attempt 1-4 is not performed before message 1-6 but only after it. In this case, the call attempt is shown with reference number 1-4'. In other words, it is also possible for a mobile station to initiate the USSD dialogue in step 1-6 before performing the call attempt in step 1-4'. Thus the steps 1-4' and 1-6 are not performed in numerical order.

The lower limit for activating the FACCH channel can be fixed, e.g. approximately 250 bytes (which corresponds to a saving of one second over SDCCH). Alternatively, the lower limit can be an adjustable network parameter which the network distributes by some suitable means, such as broadcasting, short message service, multipoint transmission (in packet radio networks), etc.

Figure 2:
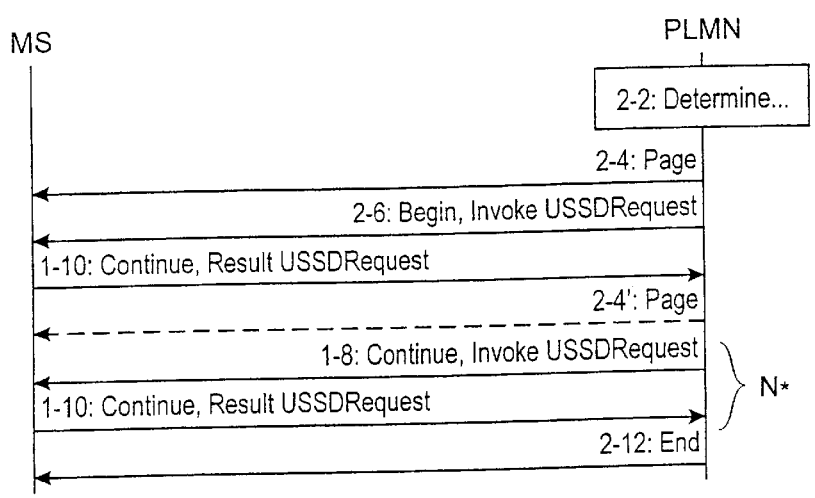

FIG. 2 is a signalling diagram illustrating a simple embodiment of a network originated USSD transfer. Messages with identical reference numbers to those in FIG. 1 have identical function and will not be described again. Step 2-2 corresponds to step 1-2 but in this case the network determines that the mobile station MS is in idle mode and the length of the USSD transfer justifies the use of the faster FACCH channel (i.e. it exceeds the lower limit). In step 2-4 the network initiates a call attempt. However, unlike in step 14 shown in FIG. 1, the network cannot call a non-existent number (obviously, because the MS would not be alerted). Instead, the network can send the MS a PAGE message in step 2-4. Steps 2-6 through 2-12 constitute a network originated USSD dialogue which is known per se. In step 2-6 the network initiates the USSD dialogue by sending a BEGIN, INVOKE USSDREQUEST message to the MS. The primed message 2-4' relates to an alternative embodiment wherein the PAGE message is sent after the message 2-6, like the alternative setup message 1-4' in FIG. 1. Messages 1-8 and 1-10 have already been explained. In step 2-12, the USSD dialogue is terminated by an END message.

Figure 3:
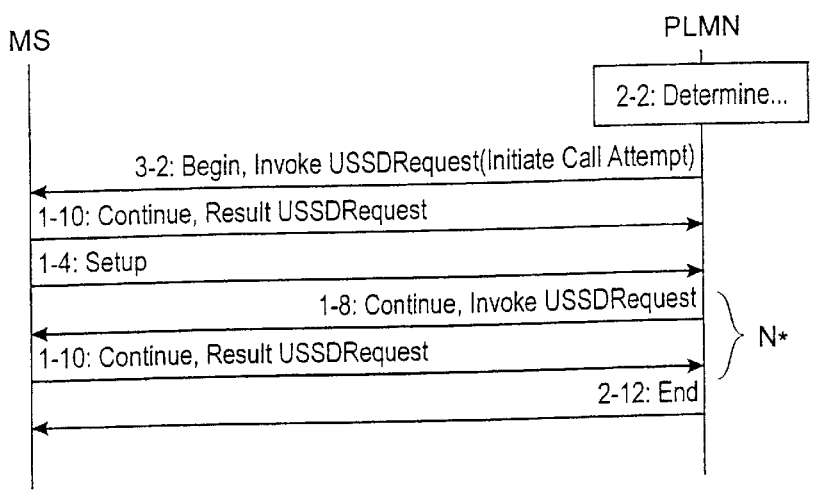

FIG. 3 is a signalling diagram illustrating a preferred embodiment of a network originated USSD transfer. The simple embodiment shown in FIG. 2 involves a problem because the user of the MS may be confused by the unsuccessful call attempt. The preferred embodiment shown in FIG. 3 eliminates this problem by converting a network originated call attempt to a mobile originated one. In step 3-2 the network PLMN sends the MS an indication that the MS must initiate a call setup procedure for activating the FACCH channel. This indication can be embedded, for example, inside a protocol-specific header or parameter in an appropriate WAP (Wireless Application Protocol) layer. In the embodiment shown in FIG. 3, this indication has been embedded in the BEGIN, INVOKE USSDREQUEST message which was shown as step 2-6 in FIG. 2. In step 1-4 the MS initiates an unsuccessful call attempt by sending a SETUP message. The remainder of the procedure is similar to the one described in connection with FIG. 2.

The preferred embodiment of the network originated USSD transfer has several advantages over the simple embodiment. For example, no special call setup routines are required in the network. Also, because the MS does not have to be paged call setup is faster and the user of the MS is not alerted.

The above-described mechanisms for activating the FACCH channel require neither hardware changes nor changes to existing GSM standards. They can be implemented as software routines in a mobile station and/or the Public Land-based Mobile Network PLMN. In the mobile station, the software routine can be installed in the cellular telephone proper, or in the associated computer, if any. Installing the software routine in the associated computer, if applicable, is advantageous in the sense that such software has a better chance of knowing or predicting the total number of USSD messages that will follow, and their combined length. Alternatively, the software routine according to the invention can be installed in the cellular telephone proper but the associated computer could give the software routine an indication that several USSD messages are likely to follow and the FACCH channel should be activated.

In the PLMN, the novel mechanisms are preferably implemented in a more distributed manner. The logic for determining if multiple USSD messages will be needed must be placed near the actual application. Typical network elements for executing OTA and VAS applications include Mobile services Switching Centres, USSD centres, Home Location Registers and Visitor Location Registers of cellular communications systems and Service Control Points of intelligent networks. The logic for performing the unsuccessful call attempt as described in connection with FIGS. 2 and 3 is preferably installed in a Mobile services Switching Centre. Other possible locations include a BTS (Base Transceiver Station), a BSC (Base Station Controller), and/or an RNC (Radio Network Controller).

Figure 4:
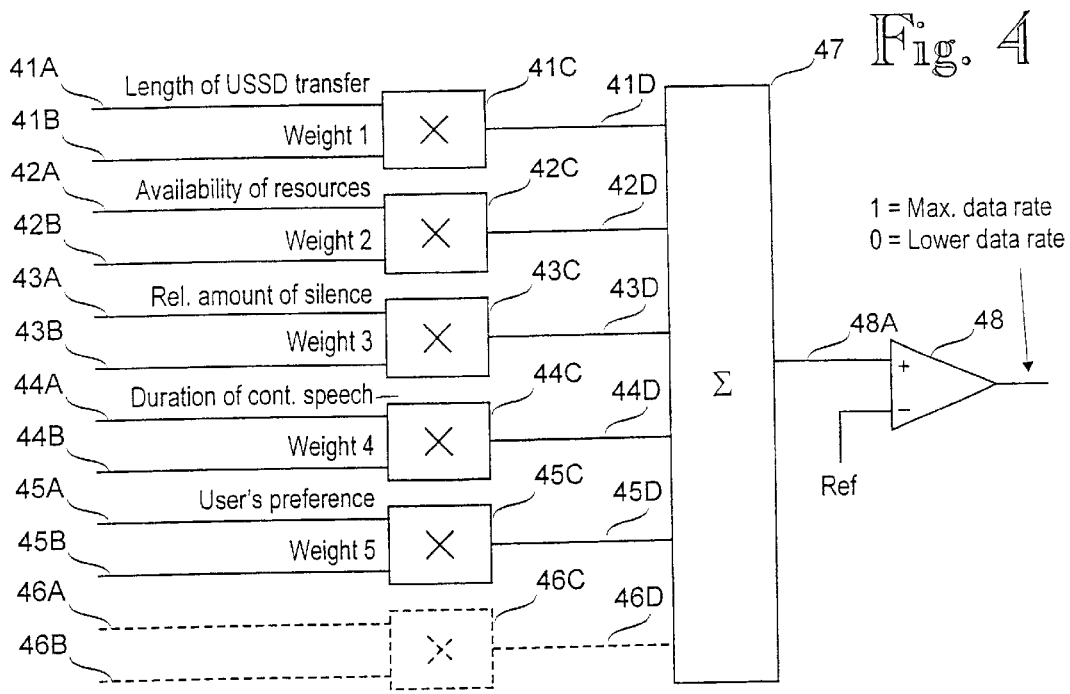
FIG. 4 is a block diagram illustrating one embodiment of the invention.

After the above description of various novel techniques for establishing an FACCH channel, the description of the present invention will now continue, with reference to FIG. 4 of the appended drawings. FIG. 4 is a block diagram illustrating one embodiment of the present invention. Although the embodiments of the invention are best implemented as software routines, some embodiments can very well be illustrated as weighing and summing circuits, artificial neurons, fuzzy logic, or the like.

Input signals 41A to 46A represent the various factors favouring the use of the maximum data rate. Input signals 41B to 46B represent the corresponding weights. Blocks 41C to 46C are the weighing circuits (e.g. multipliers) for weighing each input signal with a respective weight. The five first weighing circuits 41C to 45C with associated input and output signals have functions corresponding to the positive factors 1 to 5 described earlier. The sixth multiplier 46, drawn in dashed lines, illustrates the capability for future expansion. The output signals 41D to 46D of the weighing circuits are summed in a summer 47, the output signal of which (signal 48A) is compared by a comparator 48 with a reference level Ref. If the signal 48A exceeds the reference level Ref, the output of the comparator 48 is high, which is interpreted as a signal for using the maximum data rate.

The network operator can control the usage of the maximum data rate e.g. by transmitting to the mobile station one or more of the following: the reference level Ref (i.e. the predetermined margin); the signal 42A (the availability of network resources; and/or the relative weights 41B to 46B.

A user can favour USSD transfer speed over speech quality by setting a corresponding parameter at the mobile station. Alternatively, the corresponding functionality can be achieved by setting the corresponding parameter in the user's subscription profile in a network register, such as the HLR. The network can use this parameter when calculating the reference level which it transmits to the mobile station. The network can also transmit the parameter to the mobile station if it is considered preferable to store such user preferences with the subscription profile in a network register, instead of the mobile station.

Although it may not be feasible to implement the invention as discrete weighing and summing circuits as shown in FIG. 4, the Figure nevertheless suggests alternative embodiments. One of them is an artificial neuron, preferably an associative neuron, which can also be implemented by means of software routines. Such an artificial associative neuron can be taught to associate different situations with different outcomes and thus it can be taught when to use the maximum data rate and when not to.

Probably the best way to implement the invention is by means of some kind of an artificial neuron circuit or fuzzy logic taught by a human expert. After the teaching of the system is completed, the results of the teaching can be distributed as neuron weights.

Figure 5:
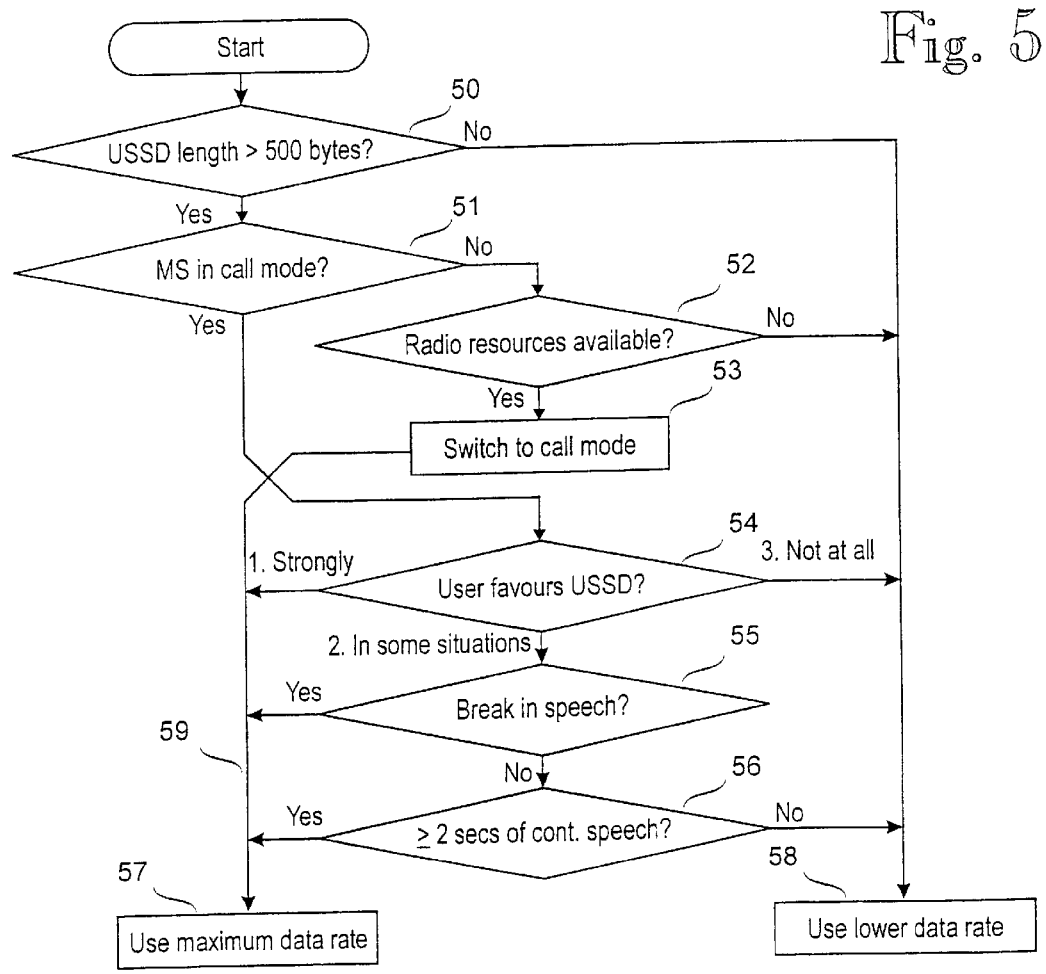
FIG. 5 is a flow chart illustrating another embodiment of the invention.

Describing fuzzy logic systems, however, is difficult (or "fuzzy"). Therefore, FIG. 5 shows another embodiment which can be described with relative ease, in the form of a flow chart. In step 50 the length of the USSD transfer is determined or estimated. If the length is less than a predetermined margin, such as approximately 500 bytes there is no need to use the FACCH (at this length, the FACCH saves approximately 2 seconds over the SDCCH). Next, in step 51, the availability of an FACCH is tested. If there is no FACCH (i.e. the MS is not in call mode), in step 52 the availability of radio resources is determined. If radio resources are available in the network, in step 53 an FACCH is established, as described above in connection with FIGS. 1 to 3. Otherwise, the SDCCH will be used and the test ends.

If the MS is in call mode in step 51 (a FACCH is available), in step 54 the user's preferences are tested. In test 54, the user has three choices: he/she may favour USSD speed over speech quality 1) strongly, 2) in some situations, when certain other conditions are met, or 3) not at all. If the user strongly favours USSD speed over speech quality, the remaining tests 55 and 56 are skipped and the process advances to step 57. If the user does not favour USSD speed at all, the remaining tests 55 and 56 are also skipped, and the process advances to step 58. If the user's preference is between these two extremes, in step 55 it is tested whether there is a break in speech (speech channel at the time mainly consists of silence indicators/SID frames instead of speech frames). If yes, the process advances to step 57. Otherwise, in step 56 it is tested whether continuous speech has been going on for a certain time, such as 2 seconds. If yes, then the listener can better tolerate the degradation in speech quality resulting from prolonged use of the FACCH, and consequently, the process advances to step 57.

If the process advances to step 57, the FACCH channel will be used. On the other hand, if the process advances to step 58, a lower data rate will be used. If the outcome of tests 51 and 52 are negative, then the SDCCH channel will be used. Otherwise, the USSD transfer takes place on the FACCH channel but at a lower data rate, or the USSD transfer is suspended until the ongoing call has ended.

Figure 6:
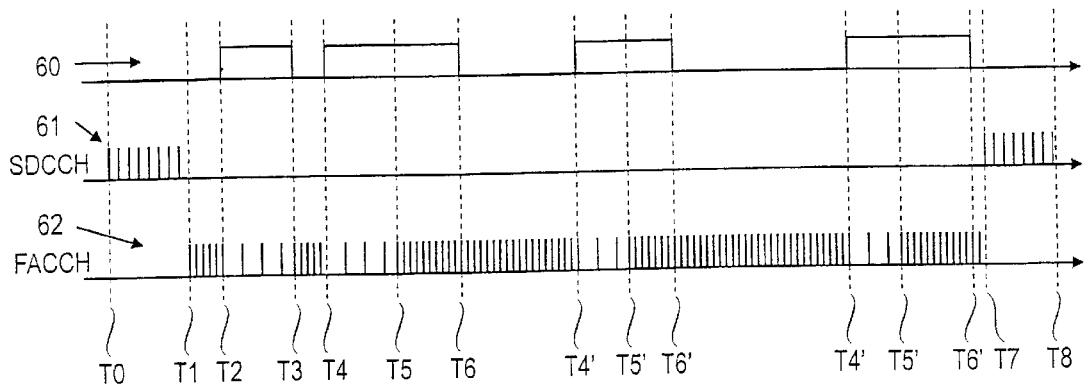
FIGS. 6 and 7 are timing diagrams illustrating preferred embodiments of the invention.

FIG. 6 is a timing diagram illustrating one embodiment of the invention. Graph 60 represents speech activity on the speech channel. Graphs 61 and 62 represent USSD activity on the SDCCH and FACCH channels, respectively. Each spike on graphs 61 and 62 represent a separate USSD message.

In the scenario shown in FIG. 6, it is assumed that either the MS user or the network operator has chosen not to use the embodiment shown in connection with FIGS. 1 to 3, i.e. a speech channel is not activated only for speeding up USSD transfer.

The USSD transfer is initiated at time T0. As no speech channel exists, the USSD transfer takes place on the SDCCH channel. At time T1 the MS enters call mode to establish a call. A speech channel now exists, and the USSD transfer takes place on the FACCH channel. As shown in FIG. 6, the USSD spikes are more frequent after T1 than before T1. At time T2, speech is detected on the speech channel, and the USSD transfer is slowed down. In this example, it is slowed down by using every third opportunity for sending a USSD message (the USSD data rate is lowered by a factor of three). At time T3, silence is detected on the speech channel, and the USSD transfer continues at full speed until time T4, when speech is again detected on the speech channel, and the USSD transfer is slowed down. This time, however, the period of continuous speech is longer (more than about two seconds), and at time T5, the USSD transfer continues at full speed although there is simultaneous speech on the speech channel. At time T6, silence is detected on the speech channel but it is of no consequence, since the USSD transfer already takes place at full speed. Times T4' to T6' correspond to times T4 to T6, respectively, but in this case, it is determined that the call has been going on for quite some time (e.g. for a minute or so). Therefore, the time difference between T4' and T5' is shorter than the time difference between T4 and T5. In other words, if there is speech on the associated speech channel, the USSD transfer is slowed down later in the call for a shorter period than in the beginning of the call. At time T7 the call ends, and the USSD transfer is continued on the SDCCH channel until time T8, when the USSD transfer ends.

Figure 7:
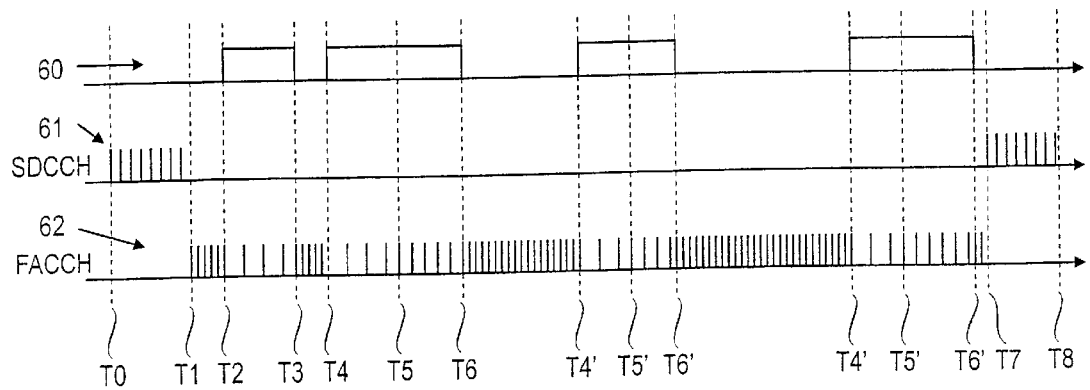

FIG. 7 shows an advantageous variation of the embodiment shown in FIG. 6. According to this advantageous variation, between times T5 and T6 (and T5' and T6' respectively), the USSD transfer takes place at a somewhat reduced speed, e.g. by using every other opportunity for sending a USSD message (the data rate is lowered by a factor of two). Such a variation requires changes in the embodiments shown in FIGS. 4 and 5. In the former, the single comparator 48 can be replaced with e.g. a quantifier logic which quantifies its input signal 48A into a number of classes, each class representing a different data rate. In the latter, the outcome 57 should be divided into multiple outcomes, e.g. by moving test 55 after the block 57 and by performing the USSD transfer at a somewhat reduced speed if the result of test 55 is negative.

Alternatively, in the embodiment shown in FIG. 4, the comparator 48 can be entirely omitted, and its input signal 48A can be used, after optional post-processing, for determining the USSD data rate. In other words, signal 48A is used as a "throttle" signal for the USSD data rate.

As described earlier, the invention involves evaluating a set of factors in favour of the maximum data rate for forming a totality of the factors and using the totality to determine the data rate to be used, e.g. by comparing the totality to a predetermined margin. FIGS. 4 and 5 illustrate two different interpretations of the totality. In FIG. 4, the totality is the output 48A of the summer 47 which is compared with the reference level Ref. In the embodiment of FIG. 5, the totality corresponds to the decision line 59 which is the result of Boolean function formed by the tests 50, 51, 52, 54, 55 and 56. If the Boolean function corresponding to decision line 59 evaluates to True (i.e. exceeds the predetermined margin of False), the maximum data rate will be used.

Prior art USSD transfer mechanisms have only a single, rigid rule for choosing between the FACCH and the SDCCH: if an FACCH exists, it will be used. The present invention breaks this rigid rule by creating a concept which is more flexible than the prior art mechanisms: if the totality of factors favouring the use of maximum data rate exceeds a predetermined margin, the maximum data rate will be used, and otherwise the data rate is at least lowered, possibly entirely stopped until an ongoing call has ended. According to a preferred embodiment of the invention, the FACCH can be used even if it has to be established for the sole purpose of speeding up USSD transfer. Also, even if the FACCH exists, it may be used at a lowered data rate if it is determined that maximum use of the FACCH would lower the quality of simultaneous speech on the speech channel.

The mechanism according to the invention is easily expandable by introducing new factors favouring the use of maximum data rate as necessary. One practical example of such new factors could be a fact that the parties of the call know each other and thus are better able to tolerate a degradation in speech quality. If a call is to/from a number which is stored in the memory of the mobile station, then the parties of the call probably know each other. The test whether or not the call is to/from such a familiar number (i.e. a number which is stored in the memory of the MS) can be easily added to the embodiments shown in FIGS. 4 and 5. In the former, an additional multiplier is needed (shown as block 46C) and in the latter, an additional test (not shown separately) is needed in or near the chain of tests 54 to 56.

The mechanism according to the invention is also more dynamic than the prior art mechanism. The network can at any time transmit to the mobile station one or more elements affecting the comparison between the totality of the positive factors and the predetermined margin. For example, the network may transmit the margin itself; one or more of the weights (see FIG. 4); and/or one or more factors to be weighed, such as an indication of the availability of radio resources in the network, or the user's preference, if such preferences are stored in a subscriber register in the network, and not in the mobile station.

The invention has been described, by way of example, in connection with the GSM cellular system (Global System for Mobile Communication). The invention is equally applicable in connection with the derivatives of GSM, such as DCS (also known as GSM 1800), and any digital mobile communications network supporting USSD transfer on a fast channel if a mobile station is involved in a call, and otherwise on a slow channel.

REFERENCE

[1] Co-assigned Finnish patent application 981692F1, "USSD Transfer Mechanism", filed on Aug. 3, 1998.

What is claimed is:

1. A method for performing a USSD transfer associated with transmitting data between a mobile station and a cellular communications network, the method comprising:

evaluating a set of factors to determine a maximum data rate associated with a totality of the factors, the totality being at least partly independent of an associated channel prior to the evaluating; and using the totality of the factors to determine whether to perform the USSD transfer at the maximum data rate or at a lowered data rate.

2. The method of claim 1, wherein an amount of data to be transferred by the USSD transfer exceeds a maximum length of one USSD message and the using the totality of factors is repeated between successive USSD messages.

3. The method of claim 1, further comprising performing the USSD transfer at the maximum data rate or at the lowered data rate and wherein performing the USSD transfer at the maximum data rate includes establishing a control channel associated with the USSD transfer if one does not exist prior to the evaluating of the totality of factors.

4. The method of claim 1, further comprising performing the USSD transfer at the maximum data rate or at the lowered rate and wherein performing the USSD transfer at the lowered rate includes performing the USSD transfer on a dedicated control channel, if one exists and, otherwise, delaying individual USSD messages or temporarily preventing the USSD transfer.

5. The method of claim 1, wherein the using the totality of factors includes comparing the totality of the factors to a predetermined margin and selecting the maximum data rate in response to a positive result in the comparison and, otherwise, selecting the lowered data rate.

6. The method of claim 1, wherein the evaluating the set of factors includes weighing each of the factors in the set of factors with a corresponding weight and combining the results of the weighing.

7. The method of claim 6, wherein the set of factors includes the amount of data to be transmitted.

8. The method of claim 6, wherein the set of factors includes an availability of radio resources in the network.

9. The method of claim 6, wherein the set of factors includes a relative amount of silence on a speech channel.

10. The method of claim 9, wherein the set of factors includes a length of time from a beginning of a call and from a latest period of silence on the speech channel.

11. The method of claim 6, wherein the set of factors includes a preference setting of a mobile station user.

12. The method of claim 6, wherein the set of factors includes a length of time from a beginning of a call or from a latest period of silence on the speech channel.

13. The method of claim 1, further comprising transmitting at least one element affecting the comparison from the network to the mobile station.

14. The method of claim 13, wherein the at least one element affects a predetermined margin.

15. The method of claim 13, wherein the at least one element affects a corresponding weight.

16. A radio transmitter for performing a USSD transfer, associated with transmitting data between a mobile station and a cellular communications network, the transmitter comprising:

means for evaluating a set of factors to determine a maximum data rate associated with a totality of the factors, the totality being at least partly independent of an associated channel prior to the evaluating; and means for using the totality of the factors to determine whether to perform the USSD transfer the maximum data rate or at a lowered data rate.

17. A radio transmitter for performing a USSD transfer, associated with transmitting data between a mobile station and a cellular communications network, the transmitter comprising:

an evaluator configured to evaluate a set of factors to determine a maximum data rate associated with a totality of the factors, the totality being at least partly independent of the existence of an associated channel prior to that evaluation; and a processor configured to use the totality of the factors to determine whether to perform the USSD transfer substantially at the maximum data rate or at a lowered data rate.

* * * * *